United States Patent
Huang et al.

(10) Patent No.: US 9,732,842 B2
(45) Date of Patent: Aug. 15, 2017

(54) LUBRICATED HARMONIC DRIVE

(71) Applicant: HIWIN TECHNOLOGIES CORP., Taichung (TW)

(72) Inventors: Po-Jung Huang, Taichung (TW); Chung-Hsien Tsai, Taichung (TW)

(73) Assignee: HIWIN TECHNOLOGIES CORP., Taichung (TW)

(*) Notice: Subject to any disclaimer, the term of this patent is extended or adjusted under 35 U.S.C. 154(b) by 228 days.

(21) Appl. No.: 14/832,188

(22) Filed: Aug. 21, 2015

(65) Prior Publication Data

US 2017/0051820 A1    Feb. 23, 2017

(51) Int. Cl.
*F16H 35/00* (2006.01)
*F16H 57/04* (2010.01)
*F16H 49/00* (2006.01)

(52) U.S. Cl.
CPC ..... *F16H 57/0471* (2013.01); *F16H 57/0427* (2013.01); *F16H 49/001* (2013.01)

(58) Field of Classification Search
CPC .................................................. F16H 49/001
USPC ........................................................ 74/640
See application file for complete search history.

(56) References Cited

U.S. PATENT DOCUMENTS

| | | | | |
|---|---|---|---|---|
| 5,984,048 A | * | 11/1999 | Kiyosawa | F16H 49/001 184/6.12 |
| 6,564,677 B1 | * | 5/2003 | Kiyosawa | F16H 35/10 475/162 |
| 6,672,181 B2 | | 1/2004 | Kobayashi | |
| 7,905,326 B2 | | 3/2011 | Kiyosawa et al. | |
| 2007/0157760 A1 | * | 7/2007 | Kiyosawa | F16C 19/52 74/640 |

* cited by examiner

*Primary Examiner* — Ha D Ho

(74) *Attorney, Agent, or Firm* — Muncy, Geissler, Olds & Lowe, P.C.

(57) ABSTRACT

A harmonic drive includes a circular spline, a cup-shaped flex spline meshed with the circular spline, a wave generator including an bearing mounted in the cup-shaped flex spline, an elliptical wheel mounted in the bearing and a coupling connected to the elliptical wheel so that an oil storage chamber is defined between the wave generator and the cup-shaped flex spline, and one or multiple stirrers connected to the coupling of the wave generator and drivable by the coupling to carry the storage lubricating oil out of the oil storage chamber for lubricating the bearing of the wave generator and the meshed tooth surfaces between the circular spline and the cup-shaped flex spline.

9 Claims, 10 Drawing Sheets

LUBRICATED HARMONIC DRIVE

BACKGROUND OF THE INVENTION

1. Field of the Invention

The present invention relates to speed reducing gear technology, and more particularly, to a lubricated harmonic drive.

2. Description of the Related Art

Harmonic drive is a high ratio of gear reducer. A conventional harmonic drive generally comprises a circular spline, a flex spline rotatably mounted within the circular spline, and a wave generator rotatably mounted within the flex spline. After installation of the wave generator in the flex spline, the flex spline is pushed by the outer perimeter of the wave generator and elastically deformed to provide an elliptical shape. Thus, when the wave generator is driven to rotate by a power source, the circular spline and the flex spline are forced to mesh with each other in the major axis of the wave generator and to disengage from each other in the minor axis of the wave generator. Due to a difference in the number of teeth between the circular spline and the flex spline, a high speed reduction ratio will be achieved to provide a high torque output after the wave generator is been continuously rotated.

In order to prolong the lifespan of the harmonic drive and to reduce wear, lubricating designs are created. For example, in the design of U.S. Pat. No. 7,905,326, the lubricating oil allows to go through an oil supply passage in the circular spline into an oil supply hole in the flex spline so that the wave generator can be well lubricated. However, because the flex spline is frequently and elastically deformed during the operation of the harmonic drive, a stress concentration can occur in the area around the oil supply hole, causing structural damage to the flex spline. Further, U.S. Pat. No. 6,672,181 discloses a lubrication mechanism for a wave gear device in which frictionally contacting parts of the external gear and wave generator and frictionally contacting parts on the inside of wave bearing are respectively lubricated using solid lubricants. However, the lubricating performance of solid is not satisfactory.

SUMMARY OF THE INVENTION

It is the main object of the present invention to provide a lubricated harmonic drive, which can lubricate the movable parts therein, prolonging the harmonic drive lifespan and reducing wear.

To achieve this and other objects of the present invention, a lubricated harmonic drive comprises a circular spline, a cup-shaped flex spline, a wave generator, and at least one stirrer. The cup-shaped flex spline is meshed with the circular spline. The wave generator comprises a bearing mounted in the cup-shaped flex spline, an elliptical wheel mounted in the bearing, and a coupling connected to the elliptical wheel. Thus, an oil storage chamber is defined between the wave generator and the cup-shaped flex spline. The at least one stirrer is connected to the coupling of the wave generator and disposed in the oil storage chamber. The stirrer can be driven by the coupling to turn about the axis of the coupling along one respective circular path.

Thus, when the coupling is rotated by a power source, the thrust stirring portions of the stirrers are forced to stir up the lubricating oil in the oil storage chamber, causing the lubricating oil to flow toward the wave generator and to further lubricate the bearing of the wave generator. The excessive amount of the lubricating oil will then flow toward the engaged tooth surfaces between the circular spline and the cup-shaped flex spline, and thus, the circular spline and the cup-shaped flex spline can be synchronously lubricated. Thus, the invention achieves the effects of prolonging the lifespan of the harmonic drive and reducing wear.

Preferably, the thrust stirring portion of each stirrer defines at least one guide surface for moving the lubricating oil to enhance the lubricating efficiency.

Preferably, two stirrers are provided and arranged at two opposite sides relative to the axis of the coupling. The distance between the circular paths of these two stirrers and the axis of the coupling can be same or different. The arrangement of the two stirrers greatly increases the total oil-stirring range, enhancing the lubricating efficiency.

DETAILED DESCRIPTION OF THE INVENTION

Figure 1:
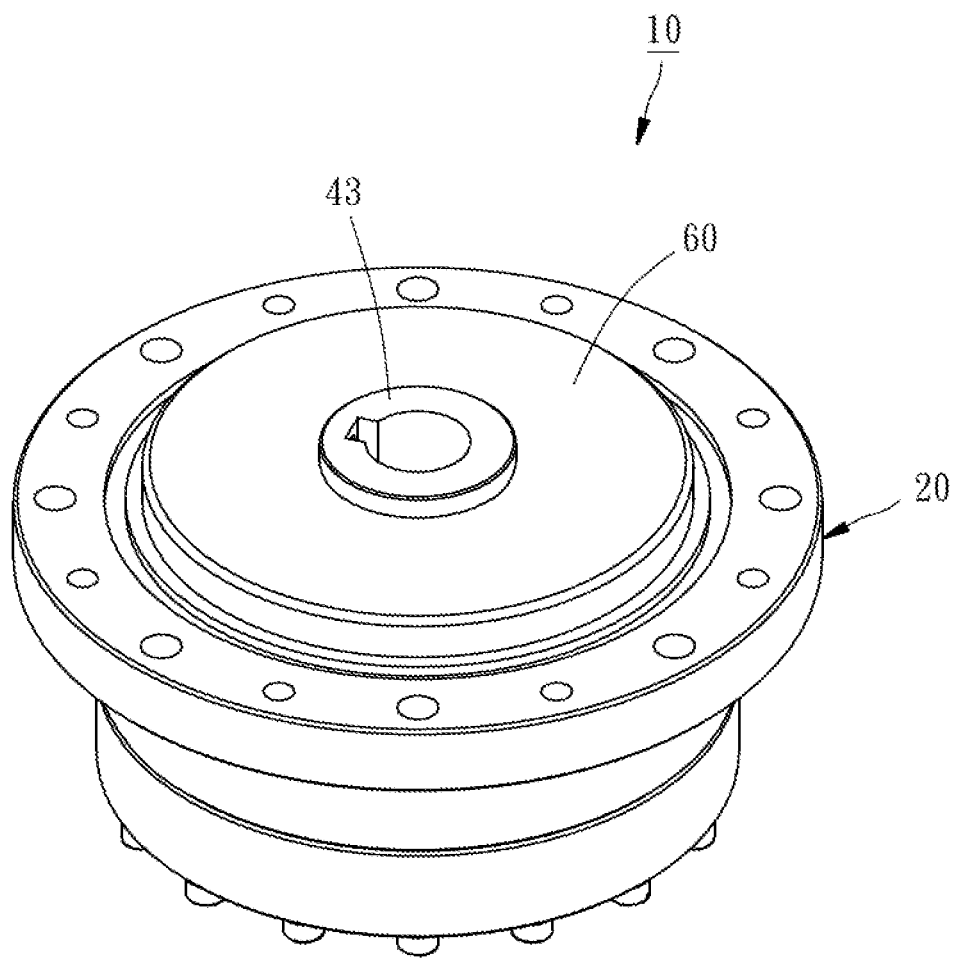
FIG. 1 is a perspective view of a lubricated harmonic drive.
Figure 2:
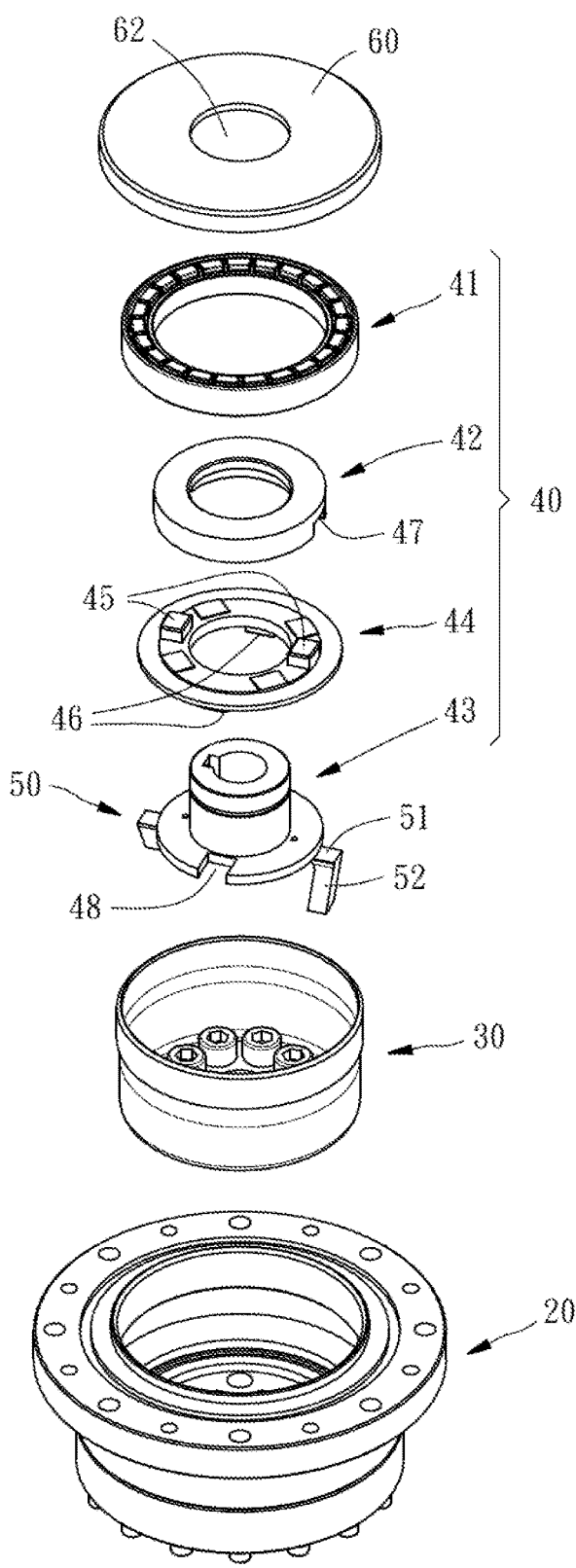
FIG. 2 is an exploded view of the lubricated harmonic drive.

Referring to FIG. 1-2, a lubricated harmonic drive 10 in accordance with the present invention is shown. The harmonic drive 10 comprises a circular spline 20, a cup-shaped flex spline 30, a wave generator 40, and at least one stirrer 50, for example, two stirrers 50 are preferred.

The cup-shaped flex spline 30 is mounted in and meshed with the circular spline 20.

As shown in FIGS. 2-7, the wave generator 40 comprises a bearing 41, an elliptic wheel 42, a coupling 43, and an adapter plate 44. The bearing 41 is mounted in the cup-shaped flex spline 30. The elliptic wheel 42 is mounted in the bearing 41. The adapter plate 44 is set between the coupling 43 and the elliptic wheel 42 to secure them together. The adapter plate 44 comprises a plurality of first protruded portions 45 located at one side thereof, and a plurality of second protruded portions 46 located at an opposite side thereof. The elliptic wheel 42 comprises two first recessed portions 47 located at one side thereof and facing toward one side of the adapter plate 44. The coupling 43 comprises two second recessed portions 48 located in the outer perimeter thereof at two opposite sides. The elliptic wheel 42 is connected to the coupling 43 by forcing the first recessed portions 47 into engagement with the respective first protruded portions 45 (see FIG. 8), and then, the coupling 43 is connected to the adapter plate 44 by forcing the second recessed portions 48 into engagement with the respective second protruded portions 46 (see FIG. 7), and thus, the coupling 43 and the elliptic wheel 42 are assembled together with adapter plate 44. Further, after installation of the wave generator 40 in the cup-shaped flex spline 30, an oil storage chamber 49 is defined between the wave generator 40 and the cup-shaped flex spline 30 for storing a lubricating oil (see FIG. 8).

Figure 3:
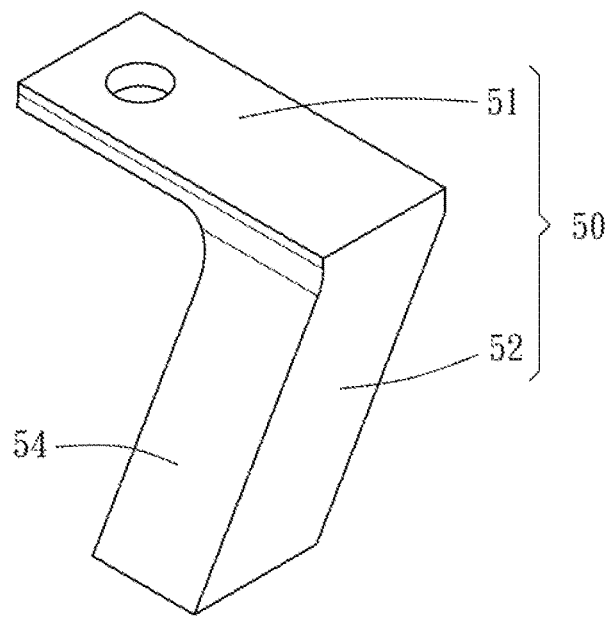
FIGS. 3-6 illustrate different forms of the stirrers.
Figure 4:
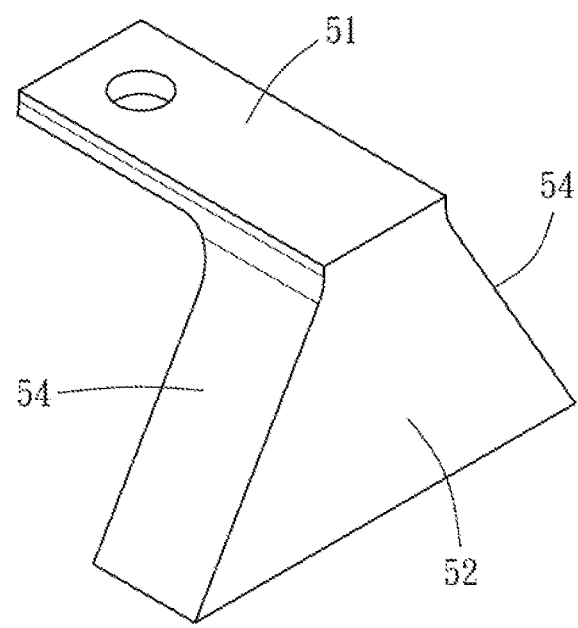
Figure 5:
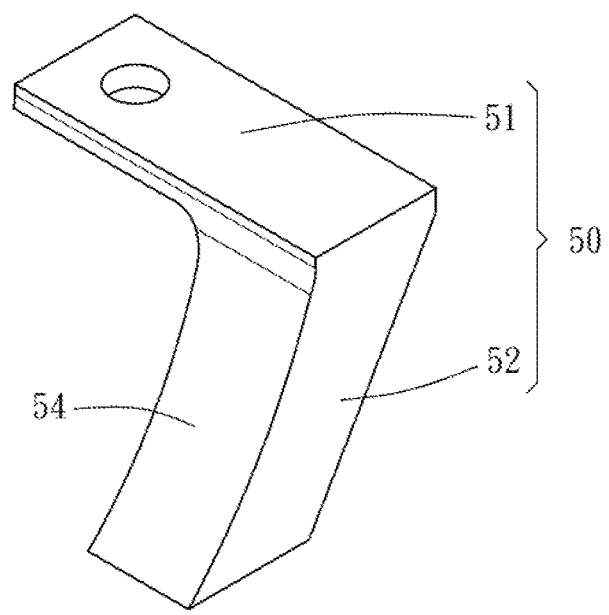
Figure 6:
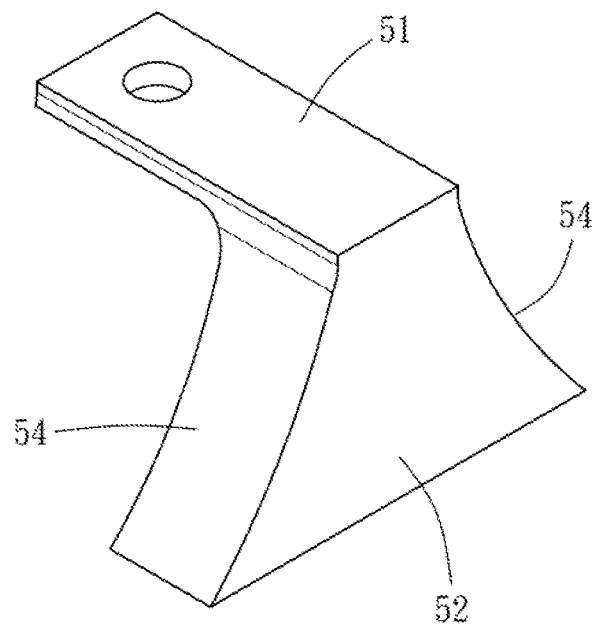
Figure 7:
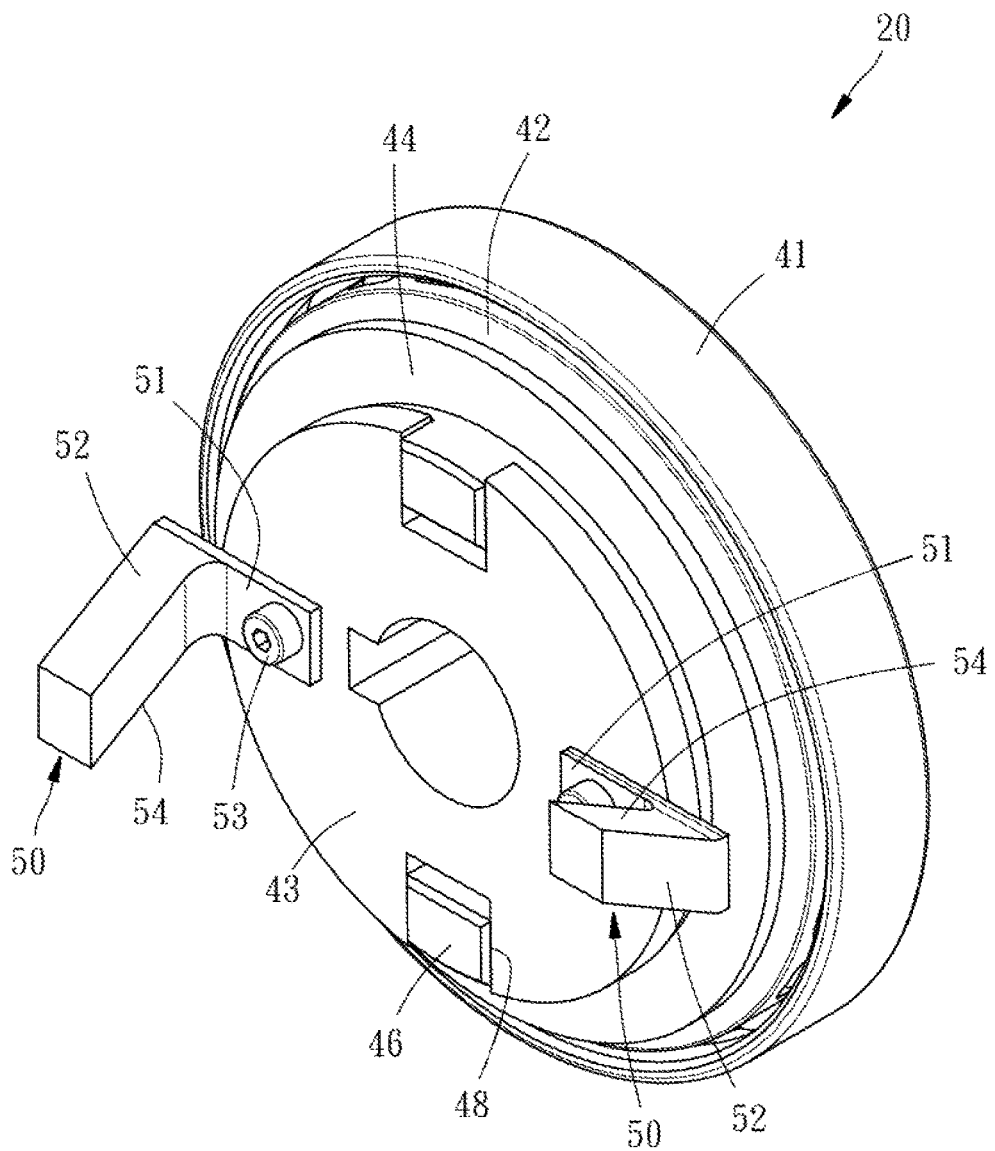
FIG. 7 is a bottom view of a part of the present invention, illustrating the relationship between the wave generator and the stirrers.
Figure 8:
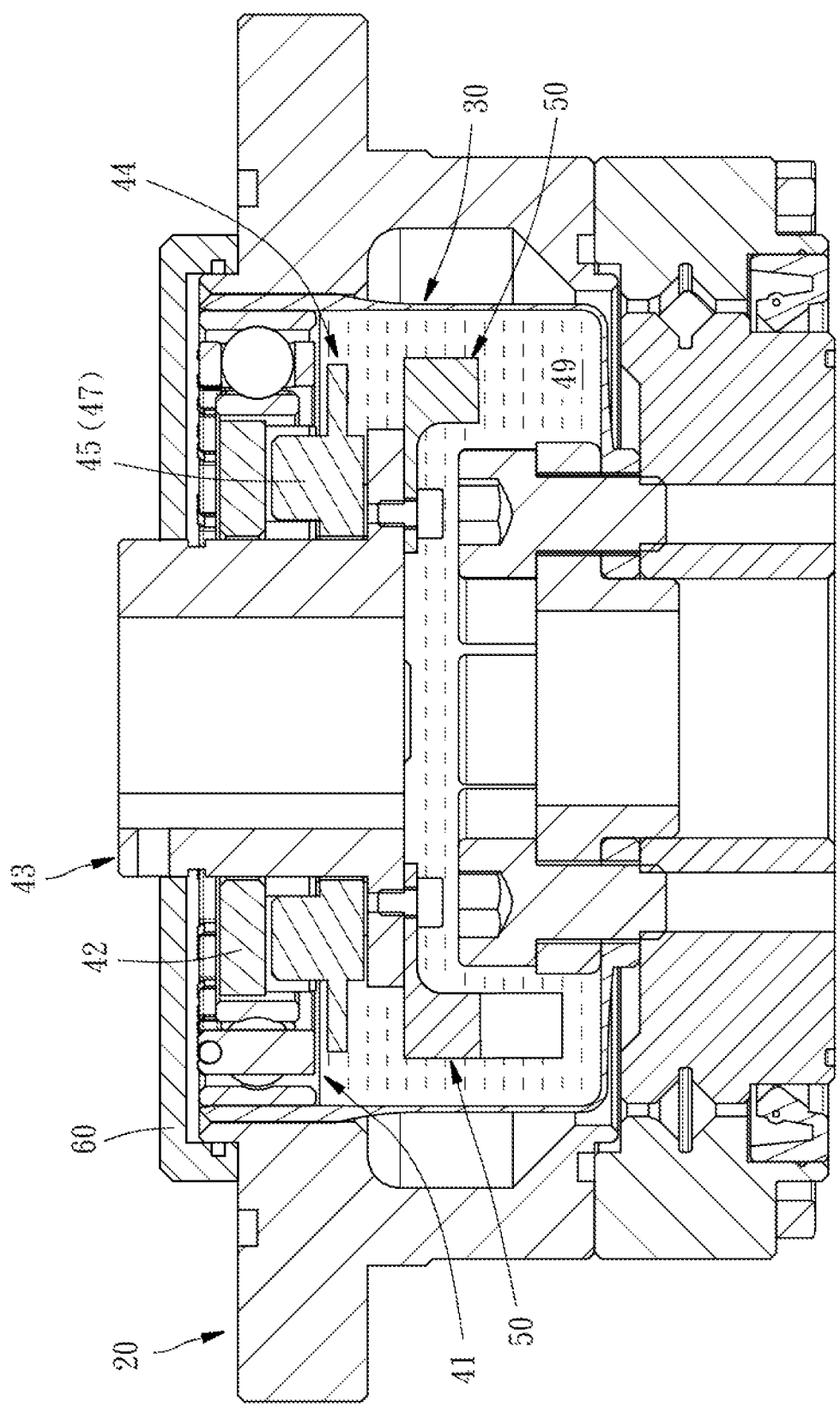
FIG. 8 is a sectional assembly view of the lubricated harmonic drive in accordance with the present invention.
Figure 9:
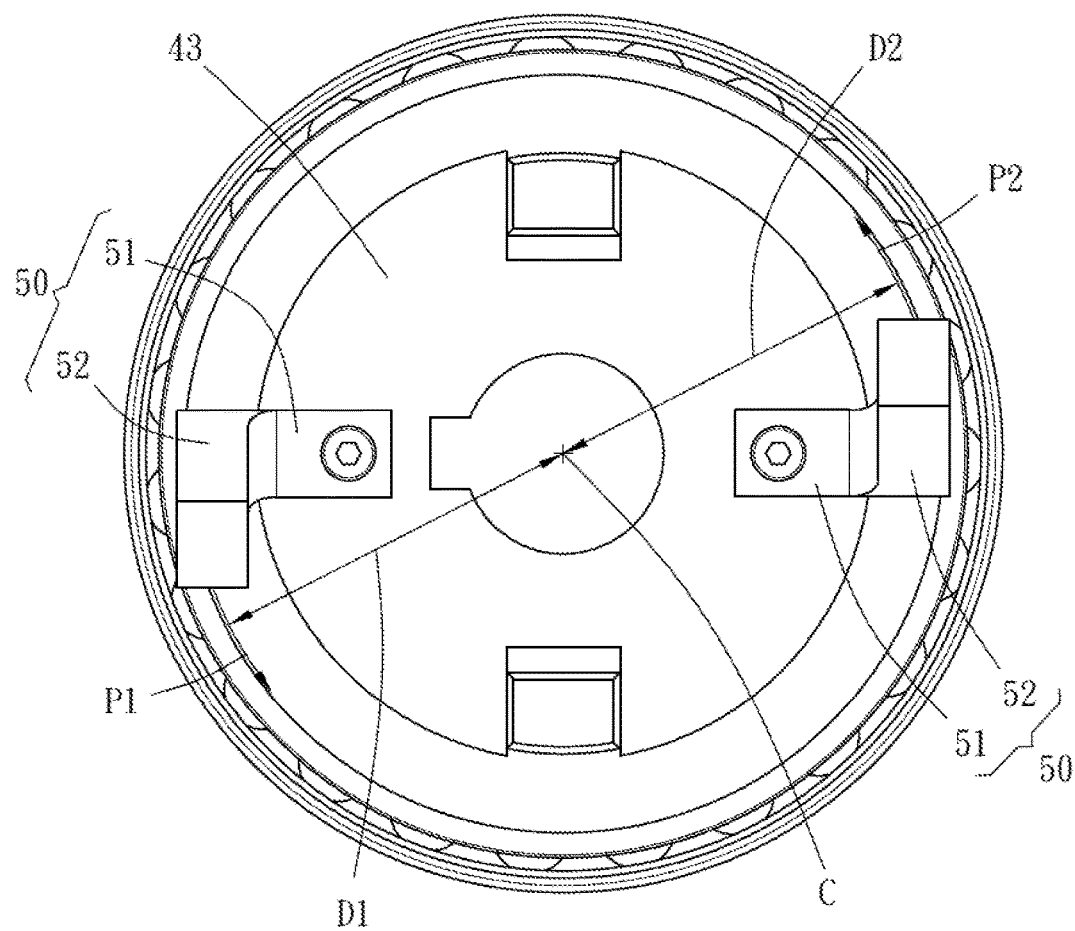
FIG. 9 is a bottom view of FIG. 7, illustrating one same distance between the two stirrers and the axis of the coupling.

As illustrated in FIGS. 7 and 8, the stirrers 50 are suspended in the oil storage chamber 49, each comprising a arm portion 51 and a thrust stirring portion 52. The arm portion 51 has one end thereof integrally connected to the thrust stirring portion 52, and an opposite end thereof fastened with a fastening member 53 to one side of the coupling 43 that faces toward the oil storage chamber 49. Further, the arm portion 51 extends perpendicularly relative to the axis C of the coupling 43. The thrust stirring portion 52 extends from the arm portion 51 in direction away from the wave generator 40. By means of the coupling 43 to drive the stirrers 50, the thrust stirring portions 52 of the stirrers 50 are respectively turned about the axis C of the coupling 43 along a respective circular path P1,P2 (see FIG. 9), stirring up the lubricating oil in the oil storage chamber 49. In this embodiment, the distances D1,D2 between the axis C of the coupling 43 and the circular paths P1,P2 of the thrust stirring portions 52 of the two stirrers 50 are same. Further, as shown in FIGS. 3, 5 and 7, the thrust stirring portion 52 of each stirrer 50 defines a guide surface 54. The guide surface 54 faces toward the direction in which the stirrer 50 is driven to move by the coupling 43. The guide surface 54 can be variously shaped, for example, it can be a slope as shown in FIG. 3, or a curved surface as shown in FIG. 5.

In order to prevent oil overflow, the invention provides a leak-proof cover 60. As illustrated in FIGS. 1, 2 and 8, the leak-proof cover 60 is located at one end face of the circular spline 20 to cover the wave generator 40. The leak-proof cover 60 has a through hole 62 through which the coupling 43 is inserted.

From the structure described above we can see that, when the coupling 43 is rotated by a power source, the thrust stirring portions 52 of the stirrers 50 are forced to stir up the lubricating oil in the oil storage chamber 49, causing the lubricating oil to flow along the guide surfaces 54 of the thrust stirring portions 52 toward the wave generator 40 and to further lubricate the bearing 41 of the wave generator 40. The excessive amount of the lubricating oil will then flow toward the engaged tooth surfaces between the circular spline 20 and the cup-shaped flex spline 30, and thus, the circular spline 20 and the cup-shaped flex spline 30 can be synchronously lubricated. Further, subject to the stoppage of the leak-proof cover 60, the lubricating oil will be forced to flow back and to lubricate the circular spline 20, the cup-shaped flex spline 30 and the wave generator 40 again.

Figure 10:
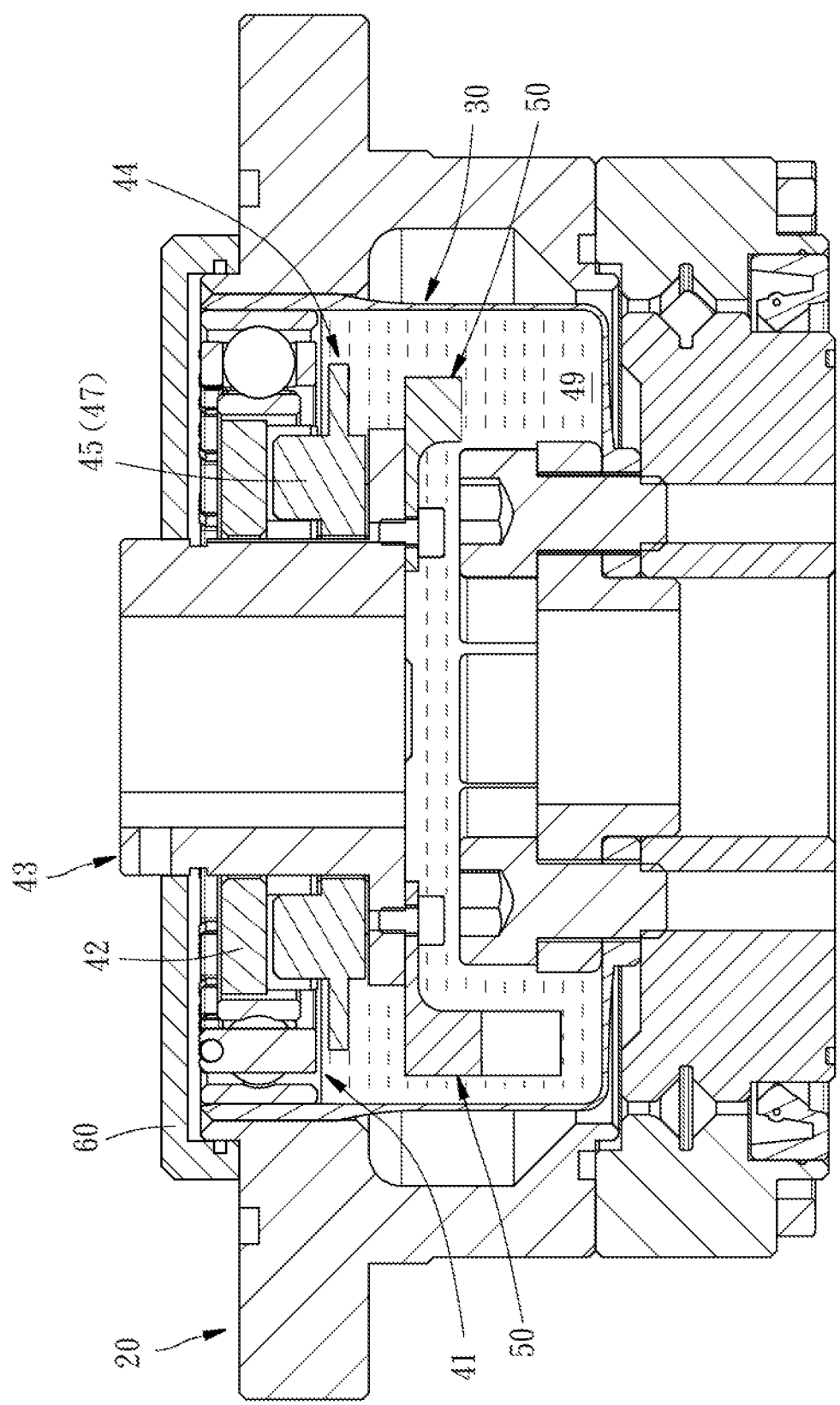
FIG. 10 is a schematic sectional assembly view of the present invention, illustrating different distances between the two stirrers and the axis of the coupling.
Figure 11:
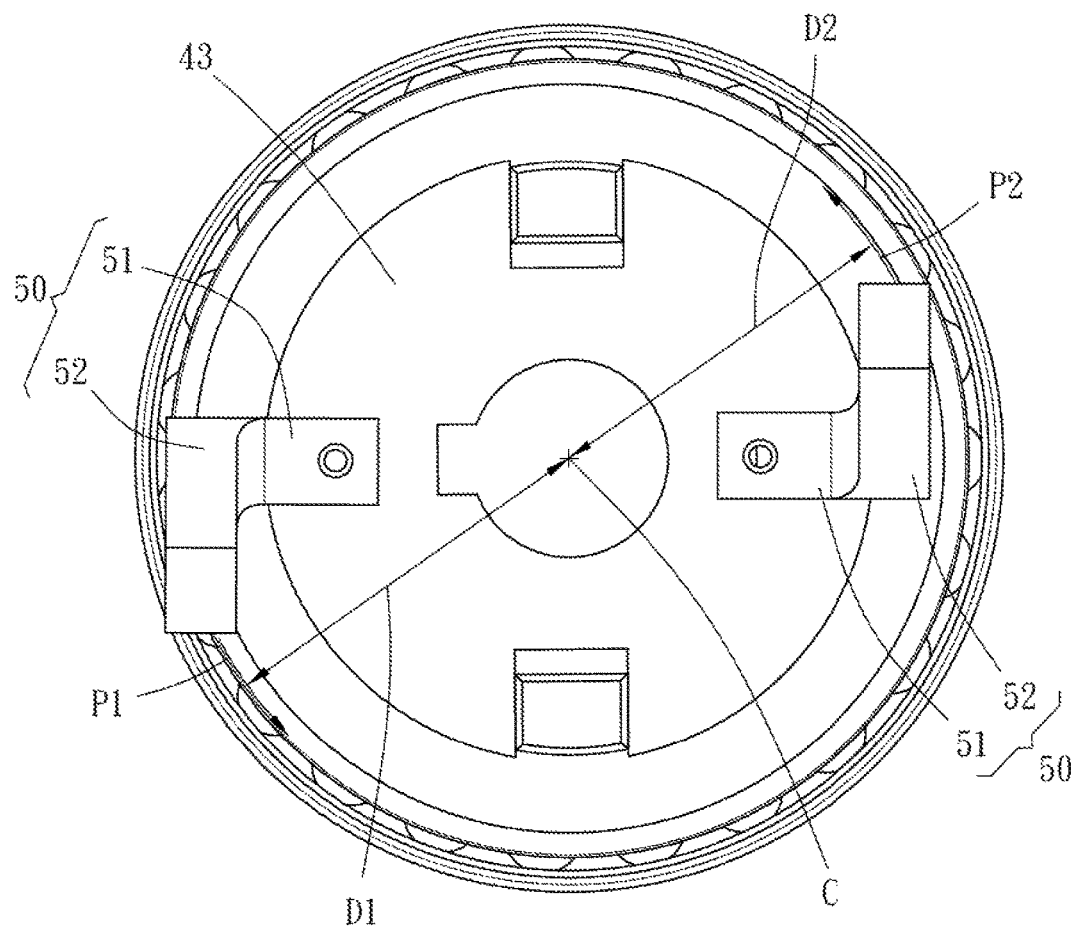
FIG. 11 is similar to FIG. 9, illustrating different distances between the two stirrers and the axis of the coupling.
Figure 12:
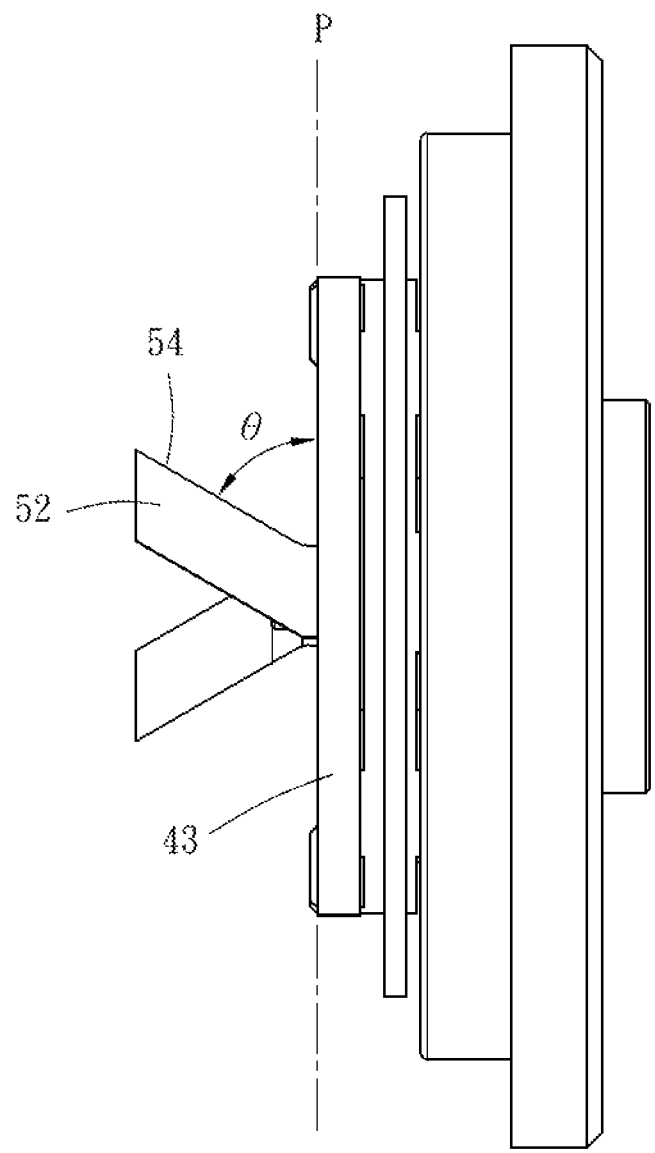
FIG. 12 is a sectional side view of a part of the present invention illustrating the angular relationship between the guide surfaces of the stirrers and the reference plane.

It is to be noted, in the above-described embodiment, each stirrer 50 defines one single guide surface 54, and thus, the stirrers 50 can simply be rotated in one direction to move the lubricating oil for lubrication. In order not to limit the turning direction of the stirrers 50, the thrust stirring portion 52 of each stirrer 50 can be configured to provide two guide surfaces 54. These two guide surfaces 54 are symmetrically disposed at two opposite sides relative to the associating arm portion 51. Thus, the stirrers 50 can move the lubricating oil for lubrication either they are turned in the clockwise direction or counter-clockwise direction, further improving lubrication efficiency. Further, in order to increase the oil-stirring range of the stirrers 50, the arrangement of the two stirrers 50 can be adjusted, as illustrated in FIGS. 10 and 11 where the distances D1,D2 between the axis C of the coupling 43 and the circular paths P1,P2 of the thrust stirring portions 52 of the two stirrers 50 are different. Thus, when the coupling 43 drives the two stirrers 50 to move, the oil-stirring ranges of the thrust stirring portions 52 of the two stirrers 50 will not be superimposed on each other, enabling the stirring effect to be carried out.

It is to be noted that the guide surface 54 of each stirrer 50 defines with a reference plane P, which extends perpendicular to the axis C of the coupling 43, a contained angle θ in the range of 50° to 85°. Defining the contained angle θ within this range enables the lubricating oil to be moved upwards along the guide surface 54. If the contained angle θ is smaller than 50°, due to the consideration of limitation on the length of the stirrers 50 to avoid interfere with the rotation of the cup-shaped flex spline 30, the effect of the stirrers 50 in stirring up the lubricating oil will be lowered, and therefore, the contained angle θ should be greater than 50°.

In conclusion, the arrangement of the stirrers 50 in the lubricated harmonic drive 10 enables the bearing 41 of the wave generator 40 to be lubricated, and can also achieve lubrication on the engaged tooth surfaces between the circular spline 20 and the cup-shaped flex spline 30. When compared to conventional techniques, the invention can effectively prolong the lifespan of the harmonic drive and reduce wear.

What is claimed is:

1. A lubricated harmonic drive, comprising:
   a circular spline;
   a cup-shaped flex spline meshed with said circular spline;
   a wave generator comprising a bearing mounted in said cup-shaped flex spline, an elliptical wheel mounted in said bearing and a coupling connected to said elliptical wheel so that an oil storage chamber is defined between said wave generator and said cup-shaped flex spline; and
   at least one stirrer connected to said coupling of said wave generator and disposed in said oil storage chamber, each said stirrer being drivable by said coupling to turn about the axis of said coupling along one respective circular path.

2. The lubricated harmonic drive as claimed in claim 1, wherein each said stirrer comprises a arm portion and a thrust stirring portion, said arm portion having one end thereof connected to said coupling and an opposite end thereof connected to said thrust stirring portion, said arm portion extending perpendicularly relative to the axis of said coupling, said thrust stirring portion being extended from the associating said arm portion in direction away from said wave generator.

3. The lubricated harmonic drive as claimed in claim 2, wherein said thrust stirring portion of each said stirrer defines at least one guide surface, each said guide surface facing toward the moving direction of the respective said stirrer.

4. The lubricated harmonic drive as claimed in claim 3, wherein said thrust stirring portion of each said stirrer defines two said guide surfaces symmetrically disposed at two opposite sides relative to the associating said arm portion.

5. The lubricated harmonic drive as claimed in claim 3, wherein each said guide surface is selectively configured in the form of a slope or curved surface.

6. The lubricated harmonic drive as claimed in claim 5, wherein the axis of said coupling extends perpendicular to a reference plane that defines with each said guide surface of each said stirrer a contained angle in the range of 50° to 85°.

7. The lubricated harmonic drive as claimed in claim 1, wherein the number of stirrer is two, and the distances between the axis of said coupling and the circular paths of the two said stirrers are same.

8. The lubricated harmonic drive as claimed in claim 1, wherein the number of stirrer is two, and the distances between the axis of said coupling and the circular paths of the two said stirrers are different.

9. The lubricated harmonic drive as claimed in claim 1, further comprising an adapter plate connected between said elliptical wheel and said coupling, said adapter plate comprising at least one first protruded portion and at least one second protruded portion respectively located at two opposite sides thereof said elliptical wheel comprising at least one first recessed portion respectively engaged with said at least one first protruded portion of said adapter plate, said coupling comprising at least one second recessed portion respectively engaged with said at least one second protruded portion of said adapter plate.

\* \* \* \* \*